United States Patent
Ohara

(10) Patent No.: US 7,333,225 B2
(45) Date of Patent: Feb. 19, 2008

(54) PRINTING SYSTEM, PRINTING APPARATUS, USER CREATED PRINT INFORMATION DATA PROVIDING METHOD AND USER CREATED PRINT INFORMATION DATA PROVIDING PROGRAM

(75) Inventor: Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 796 days.

(21) Appl. No.: 10/322,636

(22) Filed: Dec. 19, 2002

(65) Prior Publication Data

US 2003/0112465 A1 Jun. 19, 2003

(30) Foreign Application Priority Data

Dec. 19, 2001 (JP) .............................. 2001-386299

(51) Int. Cl.
G06F 15/00 (2006.01)
(52) U.S. Cl. ....................... 358/1.15; 358/1.9; 358/403; 358/442; 399/85
(58) Field of Classification Search ................. 358/1.9, 358/1.14, 1.15, 1.16, 524, 403, 404, 442; 399/76, 77, 81, 82, 85, 87
See application file for complete search history.

(56) References Cited

U.S. PATENT DOCUMENTS

| | | | |
|---|---|---|---|
| 6,213,652 B1 | 4/2001 | Suzuki et al. | ............... 358/1.15 |
| 6,341,907 B1 * | 1/2002 | Katsuyoshi | .................. 400/582 |
| 6,400,462 B1 | 6/2002 | Hille | .......................... 358/1.14 |
| 6,552,816 B1 * | 4/2003 | Shima | ........................ 358/1.15 |
| 6,606,163 B1 | 8/2003 | Suzuki et al. | ............... 358/1.15 |
| 6,707,574 B1 * | 3/2004 | Freeman et al. | ............. 358/1.9 |
| 7,002,707 B2 * | 2/2006 | Kujirai | ......................... 358/1.9 |
| 2002/0054332 A1 | 5/2002 | Akiyama et al. | ........... 358/1.15 |
| 2002/0196460 A1 * | 12/2002 | Parry | ......................... 358/1.15 |
| 2004/0008363 A1 | 1/2004 | Suzuki et al. | ............... 358/1.14 |

FOREIGN PATENT DOCUMENTS

| | | |
|---|---|---|
| JP | A-61-202221 | 9/1986 |
| JP | A-64-88821 | 4/1989 |
| JP | A 6-30180 | 2/1994 |
| JP | A-6-127041 | 5/1994 |
| JP | A-8-292850 | 11/1996 |
| JP | A-11-249781 | 9/1999 |
| JP | A-2000-181640 | 6/2000 |
| JP | A 2001-160020 | 6/2001 |

* cited by examiner

Primary Examiner—Douglas Q. Tran
Assistant Examiner—Chan S. Park
(74) Attorney, Agent, or Firm—Oliff & Berridge, PLC

(57) ABSTRACT

A printing system includes a plurality of terminal devices and a printing apparatus. The terminal devices and the printing apparatus are connected with each other via a network line. When an input panel is operated to start print job description processing, it is determined whether the print job is being executed. When it is determined that the print job is under execution and job description data for print data, which is being printed by the currently-executed print job, is stored in a RAM, the printing apparatus displays content of the job description data for the print data, which is being printed by the currently-executed print job, on a display unit. The job description data shows detailed information for print data, which is created by a user using the terminal device and sent from the terminal device to the printing apparatus with the print data.

27 Claims, 9 Drawing Sheets

FIG.8A

THE JOB DESCRIPTION FOR THE CURRENTLY-EXECUTED PRINT JOB IS AS FOLLOWS:

THIS PRINT JOB IS PERFORMED BY MR. X IN THE DESIGN SECTION. THIS DOCUMENT IS NOT SO IMPORTANT. IF A PAPER JAM OCCURS, PLEASE DO NOT HESITATE TO CANCEL THIS JOB. I WILL PICK UP MY DOCUMENTS AT 3:00 PM.

E-MAIL ADDRESS: xxxx@abc.co.jp
PHONE NUMBER: yyy-yyy-yyyy

FIG.8B

THERE IS NO JOB DESCRIPTION FOR THE CURRENTLY-EXECUTED PRINT JOB.

FIG.8C

NO PRINT JOB IS UNDER EXECUTION.

PRINTING SYSTEM, PRINTING APPARATUS, USER CREATED PRINT INFORMATION DATA PROVIDING METHOD AND USER CREATED PRINT INFORMATION DATA PROVIDING PROGRAM

BACKGROUND OF THE INVENTION

1. Field of Invention

The invention relates to a printing system, a printing apparatus, a print information providing method, and a print information providing program that provides print information based on information data assigned to print data.

2. Description of Related Art

Commonly, a network printer is connected with a plurality of terminal devices via a network and is shared between several users. The printer, which is used under such a condition, only sequentially prints out print data transmitted from the terminal devices. Therefore, it takes a lot of time to print high volumes (or a plurality pages) of print data. Only after the printing of the high volumes of the print data is completed, the printer can print the next print data. Further, there is a printer that can print out print data onto recording sheets of various sizes. When this printer runs out of the recording sheets for a current printing operation during the execution of a print job, the printer does not start the printing operation again until the printer is refilled with the recording sheets of the size, which had run out, even when the next print data is not for the recording sheets of the size, which had run out. In this state, not only is the current printing operation suspended but also subsequent printing operations are suspended. In the conventional printers, when such cases occur, the print job that interrupts the printing operation is cancelled to move subsequent print data up, and thus, the printer can print out the subsequent print data.

However, in the conventional printers, the other user cannot confirm detailed information about the print data, which is being printed in accordance with a currently executed print job (i.e. whether the print data needs to be urgently printed or includes important content). Therefore, the other user cannot cancel the currently executed print job without careful consideration.

SUMMARY OF THE INVENTION

The invention provides a printing system, a printing apparatus and a print information providing method that outputs detailed information regarding print data, and a print information providing program used in the above printing system or the above printing device.

According to one exemplary aspect of the invention, a printing system comprises a terminal unit that provides print data; a printing unit that is connected with the terminal unit and prints the print data provided from the terminal unit; an information data creating unit that allows a user to create information data using the terminal unit; an information data associating unit that associates the information data created by the information data creating unit with the print data to be printed by the printing unit; an informing unit that informs the user or another user of the information data which is associated with the print data by the information data associating unit when the print data with which the information data is associated is being processed to be printed at the printing unit; and an adjusting unit which adjusts an order in which a plurality of the print data is printed by the printing unit.

With this structure, the information data for the print data is informed by the informing unit when the print data is printed by the printing apparatus. The information data is created by a user using the information data creating unit and is transmitted from the terminal device to the printing apparatus with the associated print data. Accordingly, the user can create detailed information for the print data as the information data by using the information data creating unit to transmit the detailed information from the terminal device to the printing apparatus. Thus, the other users can confirm the detailed information for the print data based on the information data output via the informing unit.

BRIEF DESCRIPTION OF THE DRAWINGS

An embodiment of the invention will be described in detail with reference to the following figures wherein:

FIG. 8A is a diagram of a job description display page showing content of job description data;

FIG. 8B is a diagram of the job description display page showing a message to the effect that there is no job description for a print job;

FIG. 8C is a diagram of the job description display page showing a message to the effect that the print job is not currently executed.

DETAILED DESCRIPTION OF PREFERRED EMBODIMENTS

An embodiment of the invention will be described with reference to the accompanying drawings.

Figure 1:
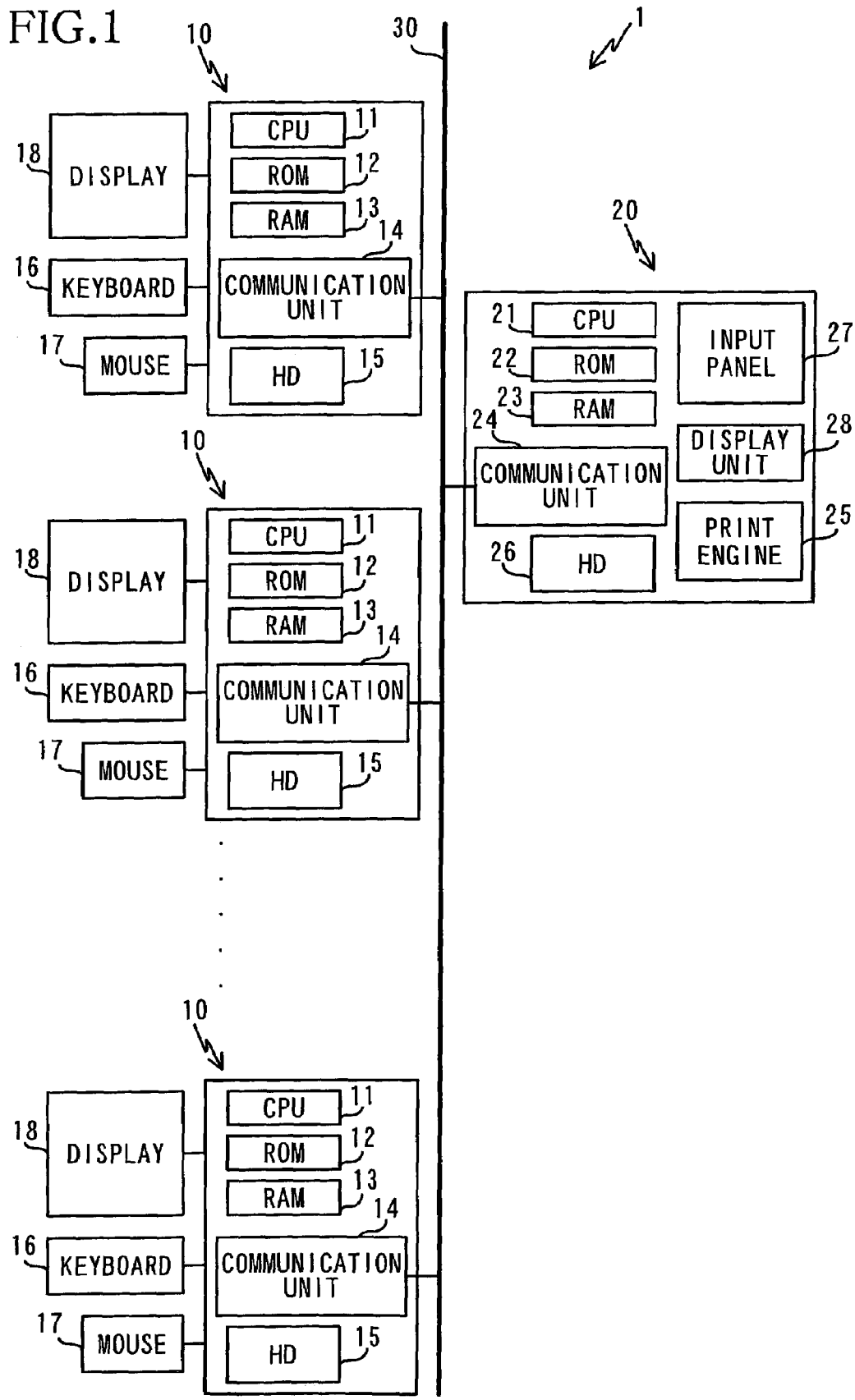
FIG. 1 is a block diagram showing a construction of a printing system.

As shown in FIG. 1, a printing system 1 includes a plurality of terminal devices 10 and a printing apparatus 20. The terminal devices 10 are connected with the printing apparatus 20 through a LAN by a network line 30.

Each of the terminal devices 10 is structured by a well-known computer system, which includes a CPU 11, a ROM 12, a RAM 13, a communication unit 14, a hard disk (HD) 15, a keyboard 16, a mouse 17, and a display 18. The terminal devices 10 are connected with the network line 30 via the communication units 14.

All of the terminal devices 10 have the same structure, so that only one of them will be described below. Various software programs, such as an operating system, a printer driver, a word processing program, a spreadsheet program and a Web (WWW) browser, are installed in the terminal device 10. When a print request to print data is made by any one of the software, other than the printer driver, the printer driver converts the print data into data that is in a format (e.g. a PDL (page description language) format) that can be printed by the printing apparatus 20 before the print data is transmitted to the printing apparatus 20 via the operating system. In addition, the printer driver performs job description edit processing (described later) in response to an operation by a user. The Web browser performs processing to transmit an HTTP request command to a Web server to request a delivery of a Web page in response to the operation by the user and processing to receive the Web page delivered from the Web server and to display the Web page on the display 18, using an HTTP (Hypertext Transfer Protocol).

The printing apparatus 20 is a well-known network printer, which includes a CPU 21, a ROM 22, a RAM 23, a communication unit 24, a print engine 25 for performing printing onto a recording sheet, a hard disk (HD) 26, an input panel 27 and a display unit 28. The printing apparatus 20 is connected with the network line 30 via the communication unit 24.

A software program is installed in the printing apparatus 20 to make the printing apparatus 20 function as the Web (WWW) server. The Web server performs processing to receive an HTTP request command transmitted via the network line 30 and processing to deliver a Web page specified by the HTTP request command to the terminal device 10 which has transmitted the HTTP request command. As a Web page, the printing apparatus 20 can deliver a job description display page, which is created by job description display page delivery processing (described later).

The job description edit processing executed by the CPU 11 of the terminal device 10 will be described with reference to FIG. 2. The job description edit processing starts in response to a selection of a print job description edit button B1 provided in a dialog box B10 for setting the printing apparatus 20 after the dialog box B10 is displayed on the display 18 as shown in FIG. 3.

Figure 4:
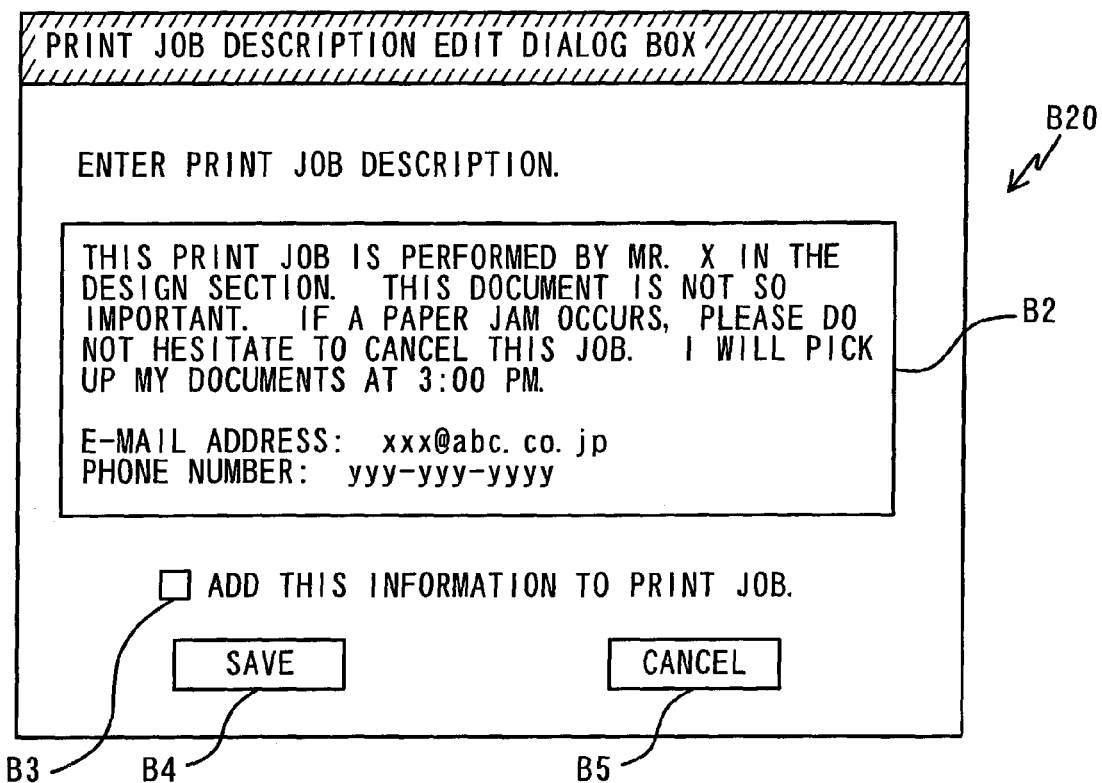
FIG. 4 is diagram showing a job description edit dialog box displayed on a display of a terminal device.

First, the CPU 11 opens a job description edit dialog box B20 (step 11, hereinafter S stands for a step). At this processing, as shown in FIG. 4, the print job description edit dialog box B20 is displayed on the display 18. The print job description edit dialog box B20 includes a text box B2, a checkbox B3, a save button B4, and a cancel button B5. The text box B2 is used to input text data, which is to be transmitted with print data by the print data transmission processing(described later). The checkbox B3 is used to indicate whether the text data input in the text box B2 is transmitted together with print data by the print data transmission processing by placing and deleting a check mark in the checkbox B3. When the user desires to transmit the text data with print data, the user marks the checkbox B3. When the user does not desire to transmit the text data with print data, the user does not mark the checkbox B3 or delete the check mark in the checkbox B3 if the check mark is placed in the checkbox B3. The save button B4 is used to save the text data, which has been input in the text box B2, in the hard disk 15. The cancel button B5 is used to cancel the settings or operations performed on the print job description edit dialog box B20.

As described above, after the job description edit dialog box B20 is displayed on the display 18 by the CPU 11 at S11, the user can input text data in the text box B2, place or delete a check mark in the checkbox B3, and select the save button B4 or the cancel button B5, using the keyboard 16 and the mouse 17.

At S12, the CPU 11 determines whether either of the save button B4 or the cancel button B5 has been selected. The CPU 11 repeatedly executes S12 until the save button B4 or the cancel button B5 is selected (S12:NO). When the save button B4 is selected (S12:YES), flow moves to S13. At this processing, an affirmative judgement is made (S13:YES) since the save button B5 was selected, and then flow proceeds to S14. At this processing, the CPU 11 saves text data into the hard disk 15 as job description data. Once the job description data is saved in the hard disk 15 as described-above, the print job description edit dialog box B20 is displayed with the job description data input in the text box b2, every time the job description edit processing is performed.

Then, at S15, the CPU 11 determines whether the checkbox B3 is marked. When the checkbox B3 is marked (S15:YES), the CPU 11 sets 1 to a check flag at S16. When the checkbox B3 is not marked (S15:NO), the CPU 11 sets 0 to the check flag at S17. As an initial value, 0 is set to the check flag. At the print data transmission processing, the check flag is referred to determine which one of the modes is set, such as a mode of transmitting job description data with print data (check flag: 1) or a mode of not transmitting job description data with print data (check flag: 0).

After the processing of S16 or S17 is complete or when the cancel button B5 is selected at S12 (S12:YES, S13:NO), the CPU 11 closes the job description edit dialog box B20 at S18. At this processing, the job description edit dialog box B20 disappears from the display 18. When the cancel button B5 is selected at S12, the job description edit processing is finished without making any changes in the job description data and the check flag.

Next, the print data transmission processing executed by the CPU 11 of the terminal device 10 will be described with reference to FIG. 5. The print data transmission processing starts when a print request is made by the software program installed in the terminal device 10.

First, at S21, the CPU 11 executes communication start processing. At this processing, a connection between the terminal device 10 and the printing apparatus 20 is established by which the CPU 11 requests the establishment of the connection to the printing apparatus 20. Thus, the terminal device 10 and the printing apparatus 20 are allowed to conduct data communications therebetween.

Then, at S22, the CPU 11 determines which one of the data transmission mode (a mode of transmitting job description data with print data) or the data non-transmission mode (a mode of not transmitting job description data with print data) has been set. At this processing, when 1 has been set to the check flag at S16, the CPU 11 determines that the data transmission mode has been set. When 0 has been set to the check flag at S17, the CPU 11 determines that the data non-transmission mode has been set.

When the CPU 11 determines that the data transmission mode has been set (S22:YES), at S23, the CPU 11 transmits the job description data, which is stored in the hard disk 15, to the printing apparatus 20.

After the processing of S23 is performed or when the CPU 11 determines that the data non-transmission mode has been set (S22:NO), the CPU 11 transmits the print data to the printing apparatus 20 at S24. At this processing, when the data transmission mode has been set, the CPU 11 transmits the print data immediately after transmitting the job description data at S23, so that the job description data and the print data are transmitted as contiguous data.

Then, at S25, the CPU 11 performs communication end processing. At this processing, the connection between the terminal device 10 and the printing apparatus 20 is broken by which the CPU 11 requests the printing apparatus 20 to break the connection. Accordingly, the data communications are finished between the terminal device 10 and the printing apparatus 20.

The print data receiving processing executed by the CPU 21 of the printing apparatus 20 will be described with reference to FIG. 6. The print data receiving processing starts in response to a request, which is made by the terminal device 10 to establish the connection at S21 of FIG. 5.

At S31, the CPU 21 performs connection start processing. At this processing, the connection between the terminal device 10 and the printing apparatus 20 is established in response to the connection request made by the terminal device 10.

Then, at S32, the CPU 21 receives data transmitted from the terminal device 10. The data to be received by the CPU 21 is either data that includes both job description data and print data, which are transmitted from the terminal device 10 as the contiguous data at S23, or data that includes only print data, which is transmitted from the terminal device 10 at S24.

At S33, the CPU 21 determines whether the data received at S32 includes job description data. When the data includes the job description data (S33:YES), the CPU 21 stores the received job description data into the RAM 23 at S34.

After the processing of S34 is performed or when the data received at S32 does not include the job description data (S33:NO), the CPU 21 stores the print data received at S32 into the RAM 23 at S35. At this processing, when the job description data is stored in the RAM 23 at S34, the print data is stored in the RAM 23 with the associated job description data.

After that, the CPU 21 performs communication end processing at S36. At this processing, the connection between the terminal device 10 and the printing apparatus 20 is broken in response to a disconnection request made by the terminal device 10.

Then, a print job corresponding to the print data stored in the RAM 23 is executed and thus the print data is printed on a recording sheet by the print engine 25.

Next, job description display page delivery processing executed by the CPU 21 of the printing apparatus 20 will be described with reference to FIG. 7. The job description display page delivery processing starts in response to a request, which is made by the terminal device 10, to transmit a job description display page.

First, the CPU 21 creates a job description display page at S41. When a job description data for print data, which is being printed by a currently-executed print job, is stored in the RAM 23, a Web page, which shows the content of the job description data is created as the job description display page. On the other hand, when the job description data, which corresponds to the print data being printed by the currently-executed print job, is not stored in the RAM 23, a Web page, which shows a message to the effect that there is no job description data for the print data currently being printed, is created as the job description display page. Further, when no print job is being executed currently, a Web page, which shows a message to the effect that no print job is under execution, is created as the job description display page.

At S42, the CPU 21 delivers the job description display page created at S41 to the terminal device 10. In the terminal device 10 that received the job description display page, when the job description data for the currently-executed print job is stored in the RAM 23 of the printing apparatus 20, the job description display page, which shows the content of the job description data, is displayed on the display 18 as shown in FIG. 8A. When the job description data for the currently-executed print job is not stored in the RAM 23 of the printing apparatus 20, the job description display page, which shows the message to the effect that there is no job description for the currently-executed print job, is displayed on the display 18, as shown in FIG. 8B. When there is no print job under execution, the job description display page, which shows the message to the effect that no print job is under execution, is displayed on the display 18, as shown in FIG. 8C.

Next, print job description display processing executed by the CPU 21 of the printing apparatus 20 will be described with reference to FIG. 9. The print job description display processing starts in response to a request, which is made through the input panel 27 to start the print job description display processing.

First, at S51, the CPU 21 determines whether a print job is currently being executed. When the print job is being executed (S51:YES), the CPU 21 determines whether the job description data for the currently-executed print job is stored in the RAM 23 at S52.

When the job description data for the currently-executed print job is stored in the RAM 23 (S52:YES), the CPU 21 displays the content of the job description data for the print data, which is being printed by the currently-executed print job, on the display unit 28 at S53.

When the job description data for the currently-executed print job is not stored in the RAM 23 (S52:NO), the CPU 21 displays the message to the effect that the job description data for the currently-executed print job is not stored, on the display unit 28 at S54.

At S51, when the CPU 21 determines that there is no print job under execution (S51:NO), the CPU 21 displays the message to the effect that no print job is under execution, on the display unit 28 at S55. After the processing of S55, S54 or S53 is complete, the print job description display processing is finished.

According to the printing system 1 as described above, the printing apparatus 20 displays the job description data on the display unit 28 in response to the operation performed by the user (FIG. 9), when the print data is printed by the print engine 25. The job description data is created (input) by the user who operates the terminal device 10 at the job description edit processing, and transmitted from the terminal device 10 to the printing apparatus 20 with the print data at S23 and S24. Therefore, the user can input detailed information for the print data as the job description data before the print data is transmitted to the printing apparatus 20 from the terminal device 10 (FIG. 2). Accordingly, the other user who operates the input panel 27 of the printing apparatus 20 can view the content of the job description data on the display unit 28. Thus, the other user can obtain the detailed information for the print data, which is being printed.

Further, if the content of the job description data is like a message shown in FIG. 8A, the user can determine the extent of the importance of the print job being processed to be printed at the printing apparatus 20. Therefore, the user can immediately take an action to cancel the print job, if a paper jam occurs, for example, if the user understands that the print job being processed is not important based on the content of the job description data. Then, the user can start the next print job smoothly at the printing apparatus 20 without a waste of time. Namely, the printing operation can be effectively performed.

Figure 7:
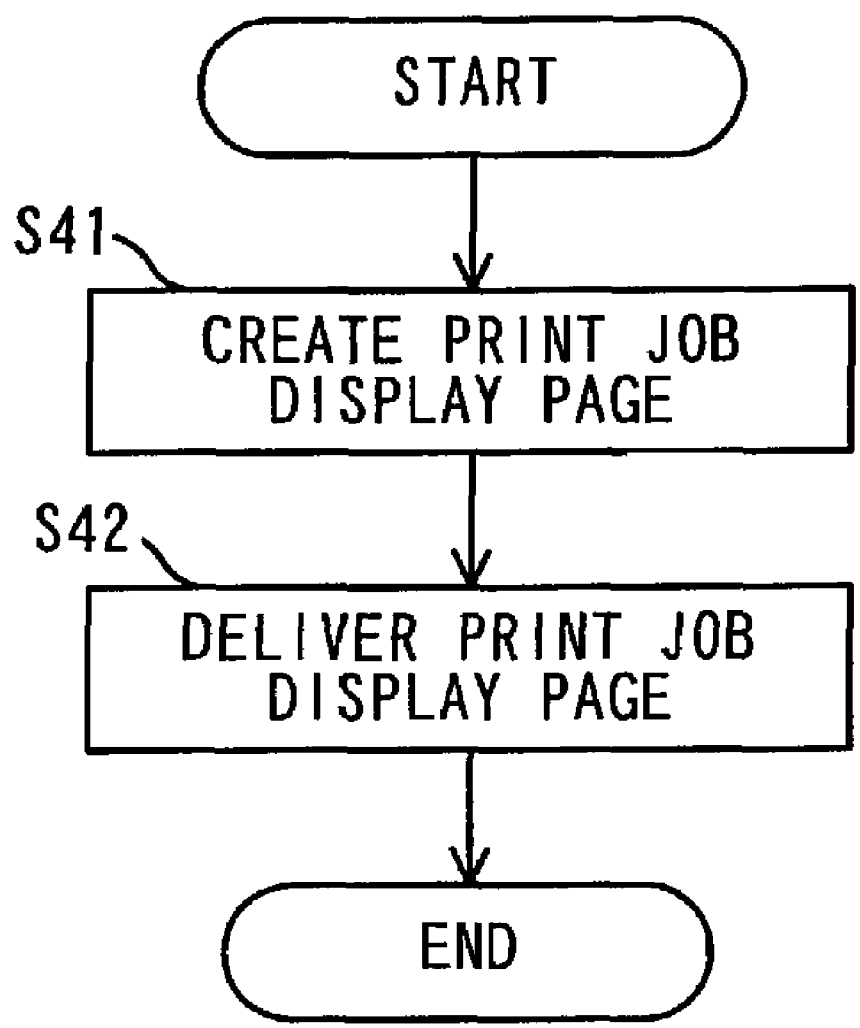
FIG. 7 is a flowchart of job description display page delivery processing.

Further, according to the printing system 1 constructed as described above, in response to the request, which is made by the terminal device 10 to deliver the job description display page, the printing apparatus 20 delivers the job description display page to the terminal device 10, which made the request, at S42 shown in FIG. 7. When the terminal device 10 receives the requested job description display page, the terminal device 10 displays the received job description display page by the Web browser function. The job description display page shows the content of the job description data, which is created (input) by the user using the terminal device 10 at the job description edit processing shown in FIG. 2 and sent from the terminal device 10 to the printing apparatus 20 with the print data at S23 and S24 shown in FIG. 5. Therefore, the user can create the detailed information data for the print data as the job description data (FIG. 2). Thus, the other user can obtain the detailed information for the print data from the job description display page, which is delivered by making a delivery request using the terminal device 10.

Figure 2:
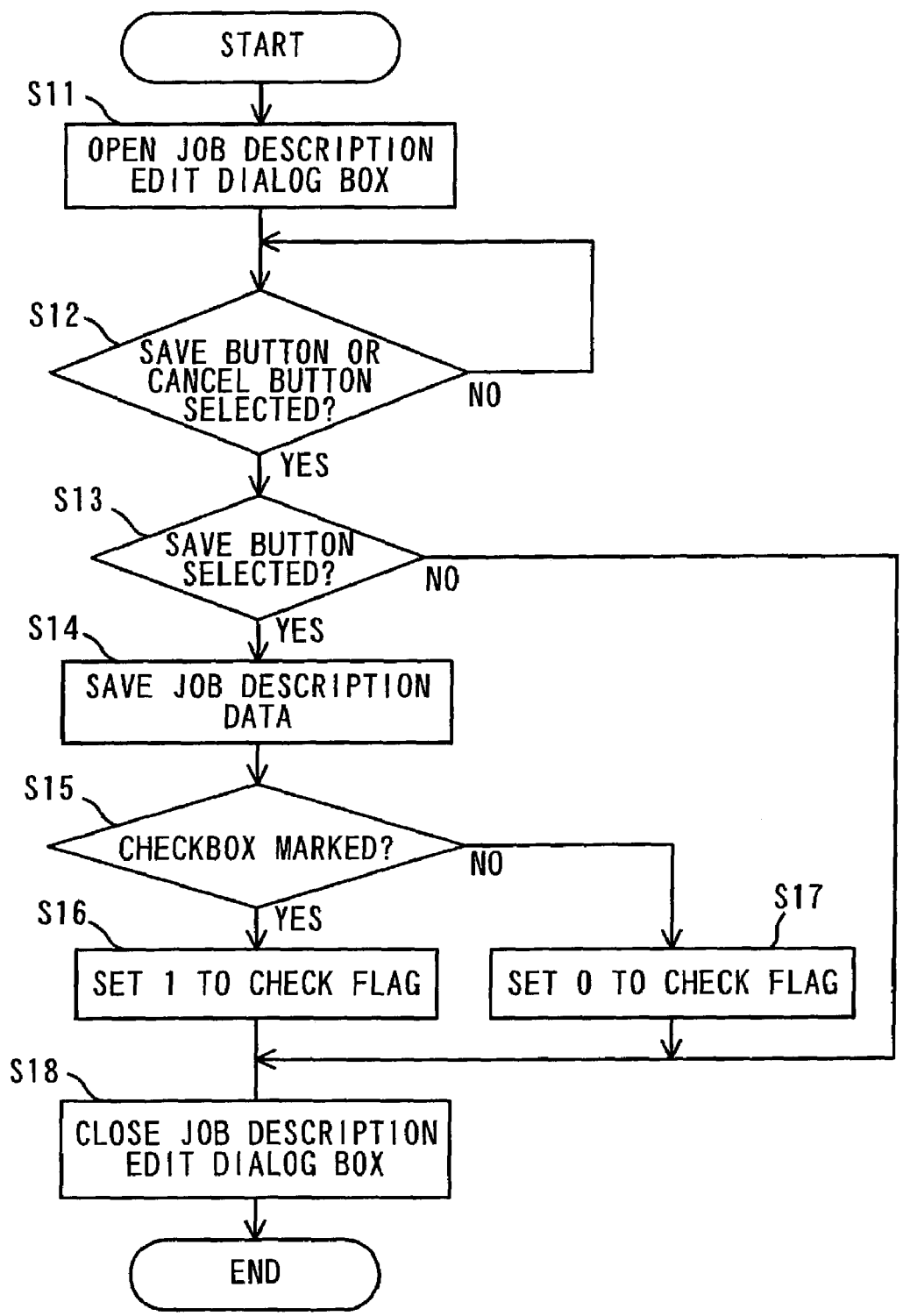
FIG. 2 is a flowchart of job description edit processing.
Figure 3:
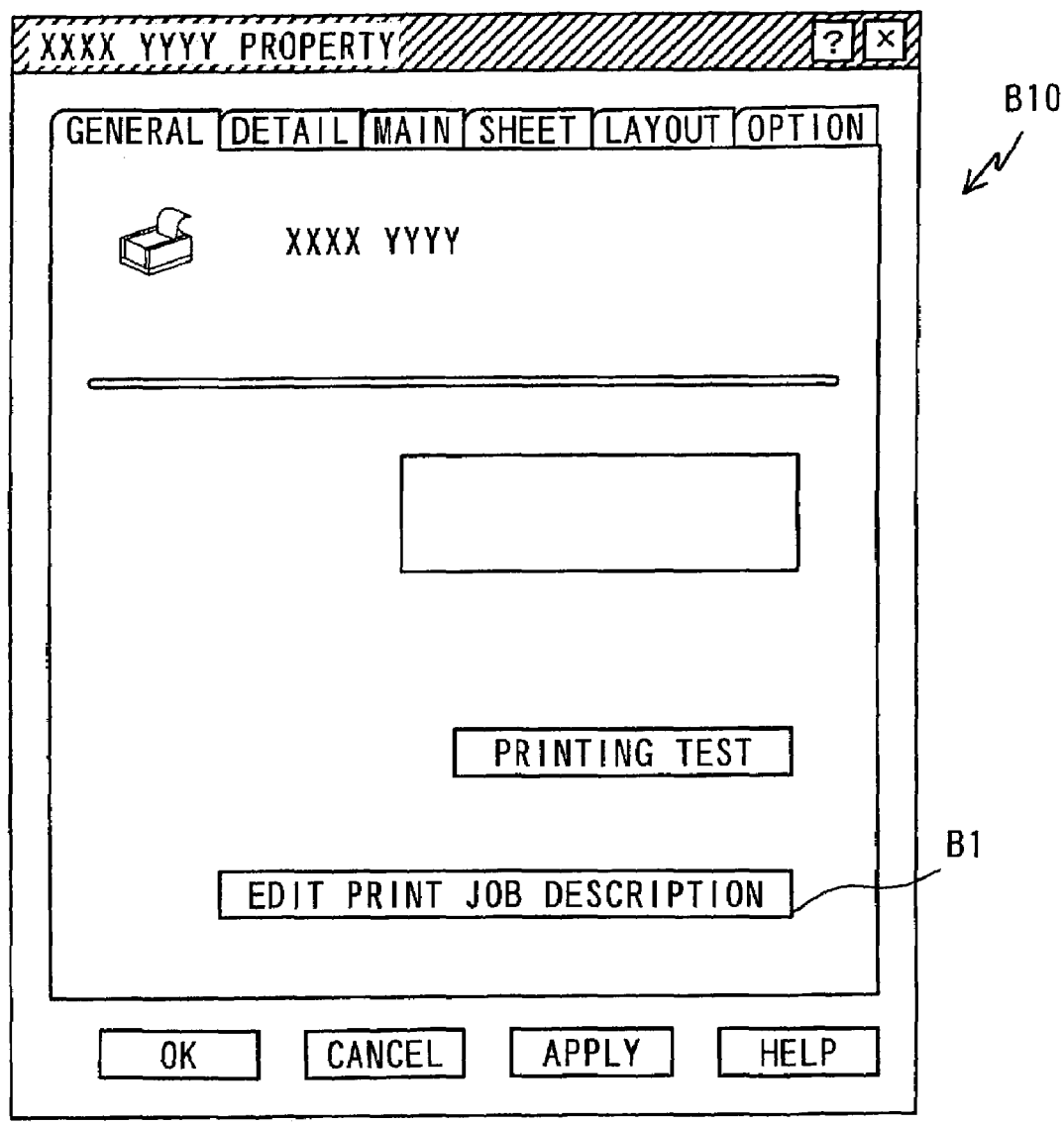
FIG. 3 is a diagram showing a dialog box for setting a printing apparatus.

In the above-described embodiment, the job description edit processing of FIG. 2 starts in response to the selection of the print job description edit button B1 of the dialog box B10 after the dialog box B10 is displayed on the display 18. However, for example, the job description edit processing may start in response to a request, which is made by the other software program to print out print data (before the print data transmission processing of FIG. 5 starts). With this structure, every time a printing operation of print data created by the other software program begins, the job description data can be renewed. Therefore, accidentally transmitting the job description data, which corresponds to the print data that has been already printed, for new print data is not likely to occur. Further, the job description edit processing is executed as a part of a series of the processing of printing print data created by the other software program, so that it becomes unnecessary to open the dialog box B10 to start the job description edit processing. Thus, it is easier for the user to perform the operation.

Figure 5:
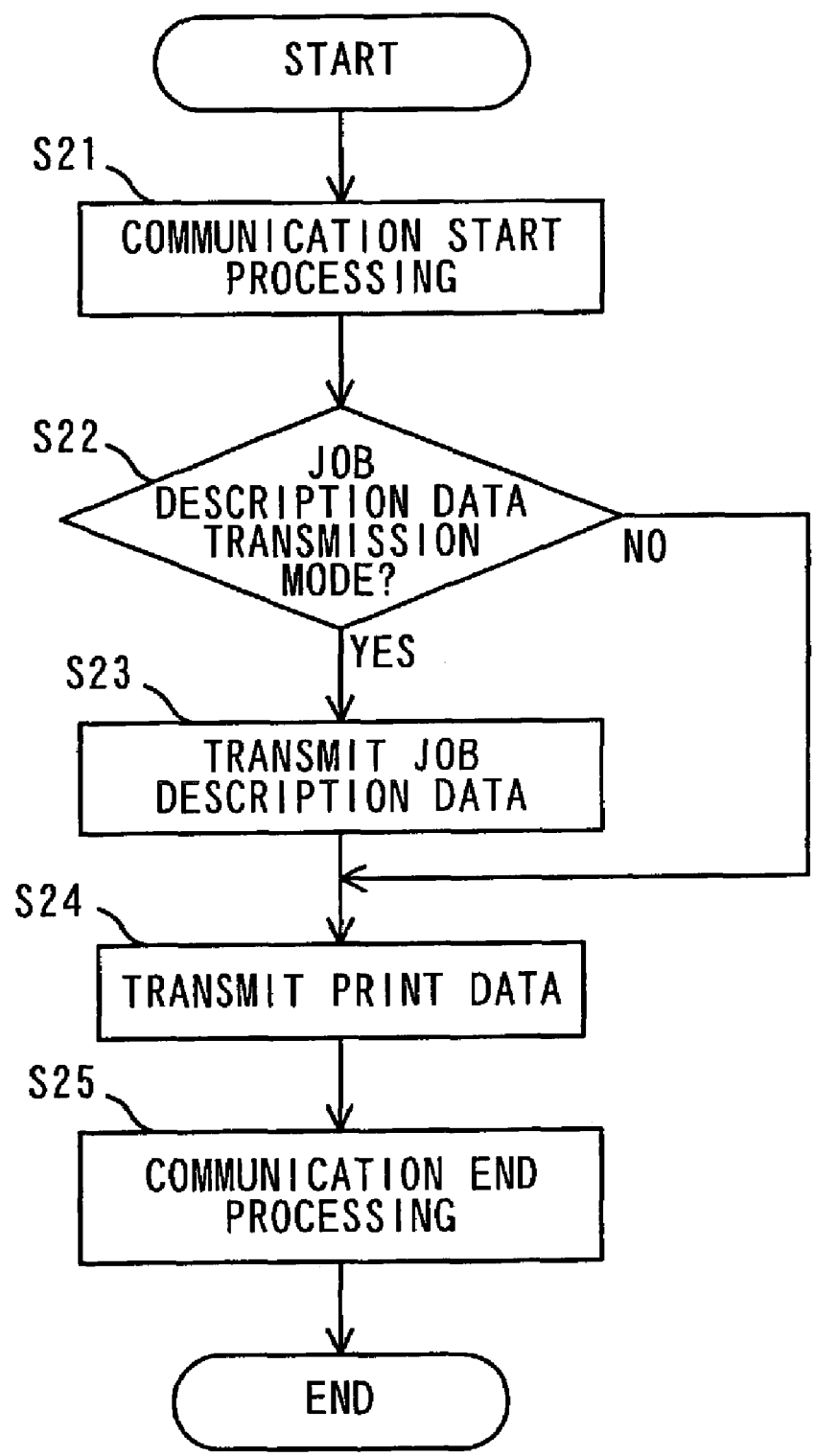
FIG. 5 is a flowchart of print data transmission processing.
Figure 6:
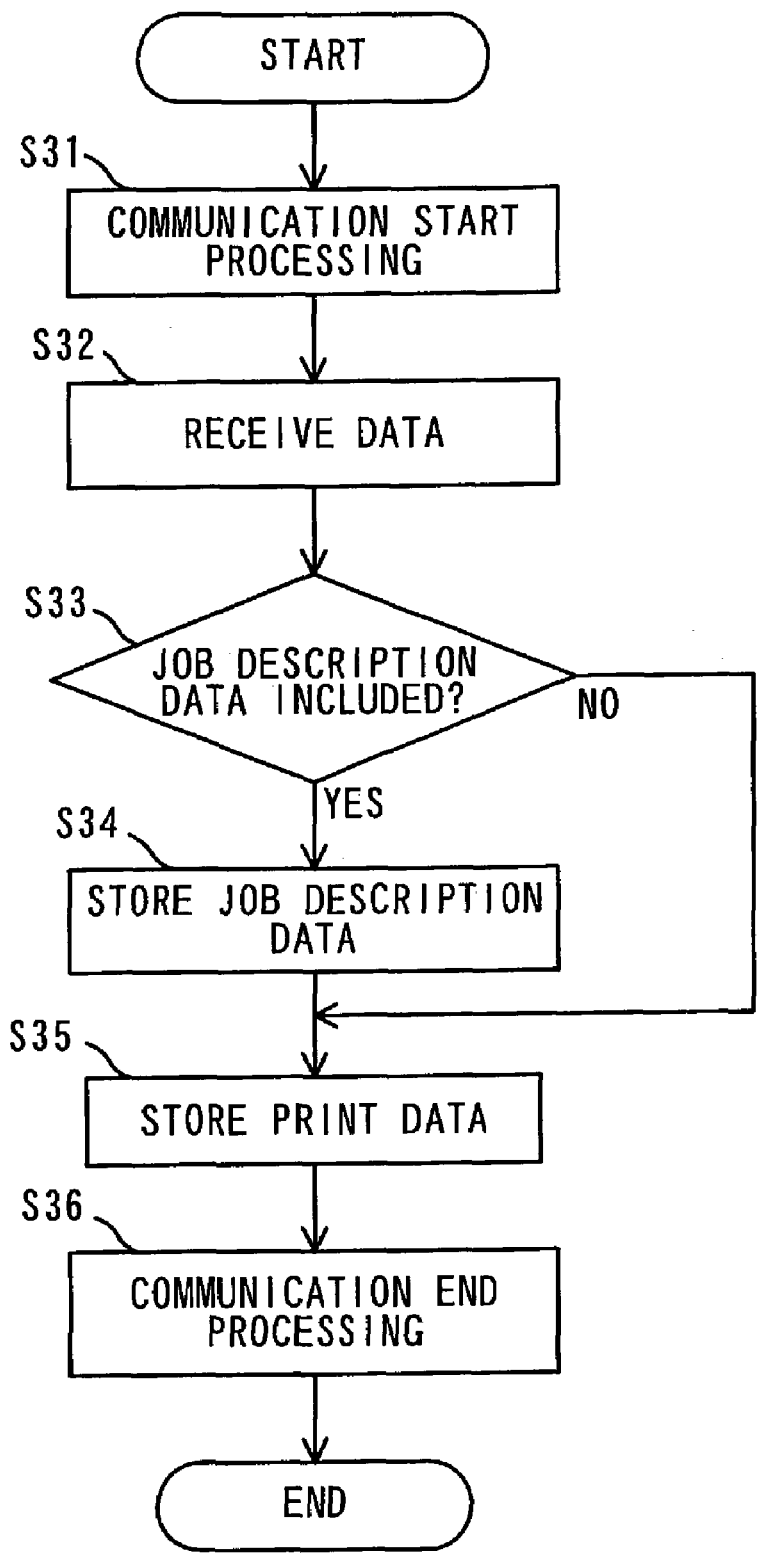
FIG. 6 is a flowchart of print data receiving processing.

In the above-described embodiment, at S23 and S24 shown in FIG. 5, the job description data is associated with the print data by which the terminal device 10 transmits the print data immediately after transmitting the job description data so that the print data and the job description data are regarded as contiguous data. However, the print data may be transmitted immediately before the job description data is transmitted.

Alternatively, for example, identification data, which can identify the corresponding print data, may be added to the job description data when transmitted at S23. By doing so, the job description data can be associated with the print data. In this case, it can be designed such that the printing apparatus 20 stores the print data in the RAM 23 at S35 of FIG. 6 while the print data is associated with the job description data when the print data, which is a subject to be identified by the identification data added to the job description data stored in the RAM 23, is received at S32.

With this structure, it is unnecessary to transmit the job description data and the print data as contiguous data. Therefore, for example, job description data, to which identification data that can identify all of the print data transmitted from the specific terminal device 10 is added, is transmitted to the printing apparatus 20 in advance. By doing so, the same job description data can be associated with the print data, which is to be transmitted from the specific terminal device 10. The identification data can be added to either or both of the print data and the job description data.

Further, in the above-described embodiment, after the terminal device 10 establishes the connection with the printing apparatus 20 at S21 shown in FIG. 5, the terminal device 10 transmits the job description data at S23 and the print data at S24 to the printing apparatus 20. After that, the terminal device 10 breaks the connection with the printing apparatus 20 at S25. Because the job description data and the print data are transmitted while the connection between the terminal device 10 and the printing apparatus 20 is established, the job description data and the print data are transmitted to the same port number (a sub address for identifying the software program).

However, the job description data and the print data may be transmitted to different port numbers. In this case, without performing the processing of S21, the processing of S22 is performed. When the data transmission mode is set (S22: YES), the terminal device 10 establishes a connection with a port number for the job description data in the printing apparatus 20, at S23. After transmitting the job description data, the terminal device 10 breaks the connection. Then, likewise, the terminal device 10 establishes a connection with a port number for the print data in the printing apparatus 20, at S24. After transmitting the print data, the terminal device 10 breaks the connection at S25.

In the above-described embodiment, when the job description data for the print data, which is being printed by the currently-executed print job, is stored in the RAM 23, the job description display page, showing the content of the job description data, is created at S41 of FIG. 7. Alternatively, at S41, the job description display page may be created so as to include the content of the job description data for subsequent print jobs as well as the content of the job description data for the currently-executed print job. With this structure, the user can determine, in advance, based on the content of the job description data shown in the job description display page, whether the subsequent print jobs can be cancelled. Further, the job description display page may be created so as to include the content of the job description data for print jobs, which have already been executed, as well as the content of the job description data for the currently-executed print job. With this structure, if the user, who transmitted to the print data to the printing apparatus, forgets to pick up his/her printed documents, the other user can find the person who printed the documents, referring to the content of the job description data shown in the job description display page.

Figure 9:
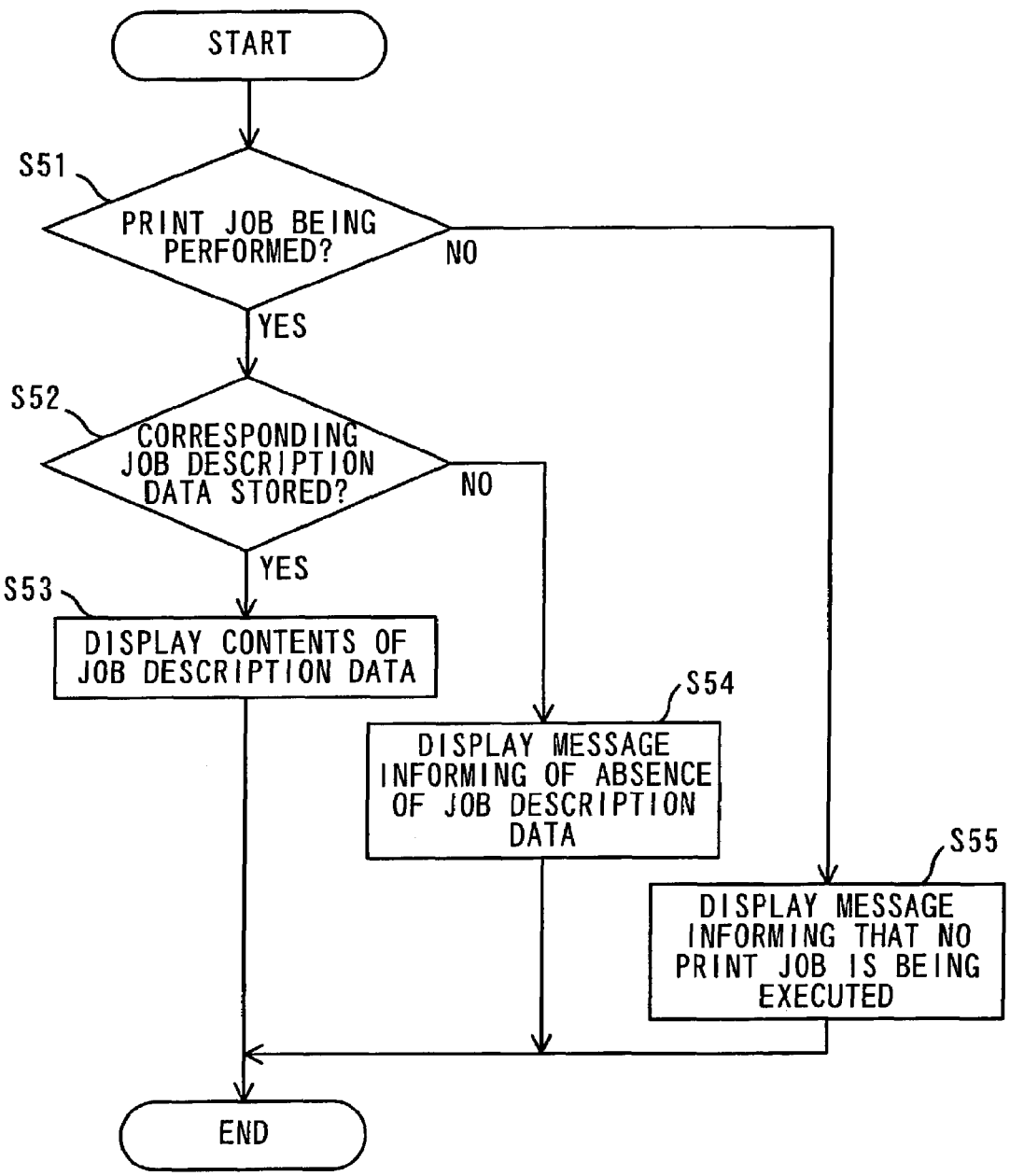
FIG. 9 is a flowchart of job description display processing.

In the above-described embodiment, it is designed such that the content of the job description data for the currently-executed print job is displayed on the display unit 28 of the printing apparatus 20 at S53 of FIG. 9. Alternatively, at S53, it may be designed such that the job description display page is displayed on the display unit 28 so as to include the content of the job description data for subsequent print jobs as well as the content of the job description data for the currently-executed print job.

With this structure, the user can determine, in advance, based on the content of the job description data shown in the job description display page, whether the subsequent print jobs can be cancelled. Further, it may be designed such that the job description display page may be displayed on the display unit 28 so as to include the content of the job description data for print jobs, which have already been executed, as well as the content of the job description data for the currently-executed print job. With this structure, if the user, who transmitted the print data to the printing apparatus 20, forgets to pick up his/her printed documents, the other user can find the person who printed the documents, referring to the content of the job description data shown in the job description display page.

In the above-described embodiment, at the job description display processing of FIG. 9, it is designed such that the content of the job description data or the messages are displayed on the display unit 28 of the printing apparatus 20 in response to the operation performed by the user. However, it may be designed such that the display unit 28 displays the job description data for the print data being printed or the messages, every time a print job is performed. With this structure, the user obtains the detailed information for the print data without operating the input panel 27, thereby simplifying the printing operation.

In the above-described embodiment, at the job description display processing of FIG. 9, the content of the job description data or the messages are displayed on the display unit 28 of the printing apparatus 20. However, another display device may be connected to the printing apparatus 20 by a cable to display the content of the job description data or the messages.

In the above-described embodiment, text for the job description data is input to the text box B2 in the job description edit dialog box B20, using the keyboard 16 and the input text is displayed on the display 18 or the display unit 28. Alternatively, the input job description data may be output by voice through a speaker or may be input by voice through a microphone.

In the printing system 1 constructed as described above, the terminal device 10 transmits print data to the printing apparatus 20 while job description data is associated with the print data. The job description data is created by the user. Then, the printing apparatus 20 receives the print data and the job description data from the terminal device 10.

After that, the printing apparatus 20 prints out the print data while displaying the job description data for the print job on the display unit 28. When the printing apparatus 20 has received a plurality of print data and job description data, the plurality of the print data are sequentially printed. In this case, every time new print data is printed, the corresponding job description data is displayed on the display unit 28.

The data format of the Web page, which shows the job description data and is delivered from the printing apparatus 20 to the terminal device 10, is not limited to specific formats, unless the data of the Web page is in a format that can be output on the display 18 of the terminal device 10.

The control of providing print information is provided by recording mediums, such as CD-ROMs, or via a communication line, such as the Internet, to the user as a print information providing program.

While the invention has been described in detail with reference to a specific embodiment thereof, it would be apparent to those skilled in the art that various changes and modifications may be made therein without departing from the spirit of the invention.

What is claimed is:

1. A printing system, comprising:
a terminal unit that provides print data;
a printing unit that is connected with the terminal unit and prints the print data provided from the terminal unit;
an information data creating unit that allows a user to create information data using the terminal unit, wherein the information data is text data typed in by the user and is a description about contents created by the user;
an informing unit that informs a user or another user of the information data which corresponds with the print data when the print data with which the information data corresponds is being processed to be printed at the printing unit;
an adjusting unit which adjusts an order in which a plurality of the print data is printed by the printing unit;
a transmitting terminal device and a printing apparatus that is connected with the transmitting terminal device, the transmitting terminal device including:
the terminal unit;
the information data creating unit;
a print data transmitting unit that transmits the print data to the printing apparatus; and
an information data transmitting unit that transmits the information data corresponding with the print data to the printing apparatus; and
the printing apparatus including:
the printing unit;
the informing unit;
the adjusting unit;
a print data receiving unit that receives the print data transmitted via the print data transmitting unit; and
an information data receiving unit that receives the information data transmitted via the information data transmitting unit, wherein the information data and the print data are transmitted to a same port number while the connection between the transmitting terminal device and the printing apparatus is established.

2. The printing system according to claim 1, wherein the printing apparatus comprises a printing device and an informing terminal device connected with the printing device,
the informing terminal device including:
the informing unit;
the adjusting unit;
a requesting unit that requests the printing device to transmit the information data, wherein the informing unit provides the information data which is provided by the printing device in response to the request made by the requesting unit,
the printing device including:
the print data receiving unit;
the printing unit;
the information data receiving unit; and
a responding unit that provides the information data with the informing terminal device, which corresponds with the print data to be printed by the printing unit, in response to the request for the information data made by the requesting unit.

3. The printing system according to claim 2, wherein the printing device further comprises a Web page creating unit that creates a Web page which includes contents to be indicated as the information data, based on the information data received via the information data receiving unit, and the responding unit provides a web page as the information data with the informing terminal device, and the informing terminal device informs the contents of the Web page provided from the responding unit, with the informing unit.

4. The printing system according to claim 1, where the information data corresponds to two or more sets of print data.

5. The printing system according to claim 1, where the information data is transmitted before or after the print data.

6. The printing system according to claim 1, where the print data and the information data are non-contiguous data.

7. The printing system according to claim 1, wherein the information data is text data typed in by the user and is a description about contents created by the user in addition to at least one of a user name and title.

8. The printing system according to claim 1, wherein the information data and the print data are mutually related.

9. The printing system according to claim 8, wherein the information data and the print data are transmitted as contiguous data.

10. A printing apparatus that is connected with a transmitting terminal device which includes a print data transmitting unit that transmits the print data to the printing apparatus, an information data creating unit that allows a user to create the information data, and an information data transmitting unit that transmits the information data corresponding with the print data to the printing apparatus, comprising:
a print data receiving unit that receives the print data transmitted via the print data transmitting unit;
a printing unit that prints the print data received via the print data receiving unit;
an information data receiving unit that receives the information data transmitted via the information data transmitting unit, wherein the information data is text data typed in by the user and is a description about contents created by the user, wherein the information data and the print data are transmitted to a same port number while the connection between the transmitting terminal device and the printing apparatus is established;
an informing unit that provides the information data which corresponds with the print data to be printed by the printing unit and is received via the information data receiving unit when the print data with which the information data corresponds is being processed to be printed at the printing unit; and
an adjusting unit which adjusts an order in which a plurality of the print data is printed by the printing unit.

11. A printing apparatus that is connected with a transmitting terminal device and an informing terminal device, wherein the transmitting terminal device includes a print data transmitting unit that transmits the print data to the printing apparatus, an information data creating unit that allows a user to create information data, wherein the information data is text data typed in by the user and is a description about contents created by the user, and an information data transmitting unit that transmits the information data corresponding with the print data to the printing apparatus, and the informing terminal device includes a requesting unit that requests for the information data transmitted from the information data transmitting unit to the printing apparatus; an informing unit that informs the information data provided in response to the request made by the requesting unit and an adjusting unit that adjusts an order in which a plurality of the print data is printed, the printing apparatus comprising:
a print data receiving unit that receives the print data transmitted from the print data transmitting unit, wherein the information data and the print data are transmitted to a same port number while a connection between the transmitting terminal device and the printing apparatus is established;
a printing unit that prints the print data received via the print data receiving unit; and
a responding unit that provides the information data, which corresponds with the print data to be printed by the printing unit, in response to the request for the information data made by the requesting unit.

12. The printing apparatus according to claim 11, further comprising a Web page creating unit that creates a Web page which includes content to be indicated as the information data, based on the information data received via the information data receiving unit, and the responding unit that provides a web page as the information data with the informing terminal device, wherein the informing terminal device informs content of the Web page provided from the responding unit, with the informing unit.

13. A print information providing method in a printing system, comprising steps of:
providing print data;
printing the print data provided at the providing step;
creating information data based on a user's input, wherein the information data is text data typed in by the user and is a description about contents created by the user;
informing the user or another user of the information data which corresponds with the print data when the print data with which the information data corresponds is being processed to be printed at the printing step;
adjusting an order in which a plurality of the print data is printed at the printing step;
preparing a transmitting terminal device;
performing steps of the providing, the creating, transmitting the print data to the printing apparatus and transmitting the information data corresponding with the print data to the printing apparatus, by the transmitting terminal device,
preparing a printing apparatus; and
performing steps of the printing, the informing, the adjusting, receiving print data transmitted at the print data transmitted step and receiving the information data transmitted at the information data transmitting step, by the printing apparatus, wherein the information data and the print data are transmitted as contiguous data to a same port number while a connection between the transmitting terminal device and the printing apparatus is established.

14. The print information providing method according to claim 13, wherein the printing apparatus preparing step includes:
preparing a informing unit;
preparing a printing device;
performing, by the informing unit, the steps of adjusting and requesting the printing device to transmit the information data to the informing unit; and
performing, by the printing device, the steps of the receiving print data; the printing, the receiving of the information data; and responding to provide the information data to the informing unit, which corresponds with the print data to be printed at the printing step, in response to the requesting step performed by the informing unit, wherein the information data provided by the printing device at the responding step is informed at the informing step.

15. The print information providing method according to claim 14, further comprising a step of performing by the printing device to create a Web page which includes content to be indicated as the information data, based on the information data received at the information data receiving step, wherein the content of the Web page is provided to the informing unit at the responding step as the information data and the content of the Web page is informed at the informing step.

16. A method of printing with a printing apparatus that is connected with a transmitting terminal device which includes a print data transmitting unit that transmits the print data to the printing apparatus, an information data creating unit that allows a user to create the information data, wherein the information data is text data typed in by the user and is a description about contents created by the user, and an information data transmitting unit that transmits the information data corresponding with the print data to the printing apparatus, comprising:
receiving the print data transmitted via the print data transmitting unit;

receiving the information data transmitted via the information data transmitting unit, wherein the information data and the print data are transmitted to a same port number while a connection between the transmitting terminal device and the printing apparatus is established;

printing the print data received at the receiving step;

providing the information data, which corresponds with the print data to be printed by the printing step and is received at the receiving step when the print data with which the information data corresponds is being processed to be printed at the printing step; and adjusting an order in which a plurality of the print data is printed by the printing unit.

17. A method of printing with a printing apparatus that is connected with a transmitting terminal device and an informing terminal device, wherein the transmitting terminal device includes a print data transmitting unit that transmits the print data to the printing apparatus, an information data creating unit that allows a user to create information data, wherein the information data is text data typed in by the user and is a description about contents created by the user, and an information data transmitting unit that transmits the information data corresponding with the print data to the printing apparatus, wherein the information data and the print data are transmitted to a same port number while a connection between the transmitting terminal device and the printing apparatus is established and the informing terminal device includes a requesting unit that requests for the information data transmitted from the information data transmitting unit to the printing apparatus, an informing unit that informs the information data provided in response to the request made by the requesting unit and an adjusting unit which adjusts an order in which a plurality of the print data is printed, comprising:

receiving the print data transmitted from the print data transmitting unit;

printing the print data received via the receiving step; and providing the information data, which corresponds with the print data to be printed by the printing step, in response to the request for the information data made by the requesting unit.

18. The method of claim 17, further comprising:

creating a Web page which includes content to be indicated as the information data, based on the information data received via an information data receiving unit, and the providing step that provides a web page as the information data with the informing terminal device, wherein the informing terminal device informs content of the Web page provided from the providing step, with the informing unit.

19. A computer readable memory medium storing a computer program product for a printing system, comprising:

a program that provides print data;

a program that prints the print data provided by the providing program;

a program that creates information data based on a user's input, wherein the information data is text data typed in by the user and is a description about contents created by the user;

a program that informs the user or another user of the information data which corresponds with the print data when the print data with which the information data corresponds is being processed to be printed by the printing program; and a program that adjusts an order in which a plurality of the print data is printed by the printing unit; and a transmitting terminal device and a printing device are provided, wherein:

the program that provides, the program that creates, a program that transmits the print data to the printing apparatus and program that transmits the information data corresponding with the print data to the printing apparatus, is performed by the transmitting terminal device, and the program that prints, the program that informs, the program that adjusts; a program that receives print data transmitted by the print data transmitted program and a program that receives the information data transmitted by the information data transmitting program, is performed by the printing apparatus, wherein the information data and the print data are transmitted to a same port number while a connection between the transmitting terminal device and the printing apparatus is established.

20. The computer readable memory medium storing a computer program product of claim 19, wherein an informing unit and a printing device are provided, wherein the program that adjusts and a program that requests the printing device to transmit the information data to the informing unit is performed by the informing unit; and the program that receives print data; the program that prints, the program that receives the information data; and a program that responds to provide the information data to the informing unit, which corresponds with the print data to be printed by the printing program, in response to the requesting program performed by the printing device, wherein the information data provided by the printing device by the responding program is informed by the informing program.

21. The computer readable memory medium storing a computer program product of claim 20, further comprising:

a program that creates a Web page which includes content to be indicated as the information data, based on the information data received at the information data receiving program, wherein the content of the Web page is provided to the informing unit by the responding program as the information data and the content of the Web page is informed by the informing program.

22. A computer readable memory medium storing a computer program product for a printing system with a printing apparatus that is connected with a transmitting terminal device which includes a print data transmitting unit that transmits the print data to the printing apparatus, an information data creating unit that allows a user to create the information data, wherein the information data is text data typed in by the user and is a description about contents created by the user, and an information data transmitting unit that transmits the information data corresponding with the print data to the printing apparatus, comprising:

a program that receives the print data transmitted via the print data transmitting unit;

a program that prints the print data received by the receiving a program;

a program that receives the information data transmitted via the information data transmitting unit;

a program that provides the information data, which corresponds with the print data to be printed by the printing program and is received by the receiving program when the print data with which the information data corresponds is being processed to be printed by the printing program, wherein the information data and the print data are transmitted to a same port number while a connection between the transmitting terminal device and the printing apparatus is established, and a program that adjusts an order in which a plurality of the print data is printed by the printing program.

23. A computer readable memory medium storing a computer program product for a printing system with a printing apparatus that is connected with a transmitting terminal device and an informing terminal device, wherein the transmitting terminal device includes a print data transmitting unit that transmits the print data to the printing apparatus, an information data creating unit that allows a user to create information data, wherein the information data is text data typed in by the user and is a description about contents created by the user, and an information data transmitting unit that transmits the information data corresponding to the print data to the printing apparatus, and the informing terminal device includes a requesting unit that requests for the information data transmitted from the information data transmitting unit to the printing apparatus, an informing unit that informs the information data provided in response to the request made by the requesting unit and an adjusting unit which adjusts an order in which a plurality of the print data is printed, comprising:

a program that receives the print data transmitted from the print data transmitting unit, wherein the information data and the print data are transmitted to a same port number while a connection between the transmitting terminal device and the printing apparatus is established;

a program that prints the print data received via the receiving program; and a program that provides the information data, which corresponds with the print data to be printed by the printing program, in response to the request for the information data made by the requesting unit.

24. The computer readable memory medium storing a computer program product of claim 23, further comprising:

a program that creates a Web page which includes content to be indicated as the information data, based on the information data received via an information data receiving unit, and the providing program that provides a web page as the information data with the informing terminal device, wherein the informing terminal device informs content of the Web page provided from the providing program, with the informing unit.

25. A printing system, comprising:

a terminal unit that provides print data;

a printing unit that is connected with the terminal unit and prints the print data provided from the terminal unit;

an information data creating unit that allows a user to create information data using the terminal unit, wherein the information data is a message typed in by the user;

an informing unit that informs a user or another user of the information data which corresponds with the print data when the print data with which the information data corresponds is being processed to be printed at the printing unit;

a transmitting terminal device and a printing apparatus that is connected with the transmitting terminal device, the transmitting terminal device including:

the terminal unit;

the information data creating unit;

a print data transmitting unit that transmits the print data to the printing apparatus; and an information data transmitting unit that transmits the information corresponding to the print data to the printing apparatus; and the printing apparatus including:

the printing unit;

the informing unit;

a print data receiving unit that receives the print data transmitted via the print data transmitting unit; and an information data receiving unit that receives the information data transmitted via the information data transmitting unit, wherein the information data and the print data are transmitted to a same port number while a connection between the transmitting terminal device and the printing apparatus is established.

26. The printing system according to claim 25, wherein the message is text data.

27. A printing apparatus in accordance with the printing system of claim 26.

* * * * *